United States Patent [19]

Epworth et al.

[11] Patent Number: 4,781,428
[45] Date of Patent: Nov. 1, 1988

[54] DEVICES AND METHODS FOR SELECTIVELY TAPPING OPTICAL ENERGY FROM AN OPTICAL FIBRE

[75] Inventors: Richard E. Epworth, Bishop Stortford; Stephen Wright, London; Roger J. Brambley, Great Dunmow; David F. Smith, Harlow, all of Great Britain

[73] Assignee: STC PLC, London, England

[21] Appl. No.: 748,296

[22] Filed: Jun. 24, 1985

[30] Foreign Application Priority Data

Jul. 11, 1984 [GB] United Kingdom ............... 8417663

[51] Int. Cl.⁴ .............................................. G02B 6/34
[52] U.S. Cl. ............................ 350/96.19; 350/96.15; 350/96.29
[58] Field of Search ............... 350/96.15, 96.16, 96.19, 350/96.20, 96.29, 96.30, 320; 250/227

[56] References Cited

U.S. PATENT DOCUMENTS

| | | | |
|---|---|---|---|
| 3,931,518 | 1/1976 | Miller | 350/96.15 X |
| 4,019,051 | 4/1977 | Miller | 350/96.15 X |
| 4,135,780 | 1/1979 | Dyott | 350/96.15 |
| 4,236,786 | 12/1980 | Keck | 350/96.15 |
| 4,268,116 | 5/1981 | Schmadel et al. | 350/96.29 |
| 4,342,907 | 8/1982 | Macedo et al. | 250/227 |
| 4,449,210 | 5/1984 | Myer | 350/96.29 X |
| 4,530,078 | 7/1985 | Lagakos et al. | 350/96.29 X |
| 4,586,783 | 5/1986 | Campbell et al. | 350/96.15 |

OTHER PUBLICATIONS

Bulmer et al., "Single Mode Grating Coupling Between . . . ", *IEEE Journal of Quantum Electronics*, vol. QE-14, No. 10, Oct. 1978, pp. 741-749.
Youngquist et al., "Two-Mode Fiber Modal Coupled", *Optics Letters*, vol. 9, No. 5, May 1984, pp. 177-179.

*Primary Examiner*—John Lee
*Attorney, Agent, or Firm*—Lee & Smith

[57] ABSTRACT

Optical energy at a predetermined frequency or narrow band of frequencies is tapped from an optical fibre by causing spatially periodic deformation of the fibre such as to produce coupling of optical energy between modes of the fibre, for example between the core and cladding of a single mode fibre, at the predetermined frequency and removing the optical energy at the predetermined frequency, for example by means of a cladding mode tap for a single mode fibre. If the deformation means includes a mechanical grating then tuning of the coupling frequency can be achieved by changing the relative orientation (O) of the fibre and the grating.

11 Claims, 2 Drawing Sheets

DEVICES AND METHODS FOR SELECTIVELY TAPPING OPTICAL ENERGY FROM AN OPTICAL FIBRE

BACKGROUND OF THE INVENTION

This invention relates to optical fibres and in particular to devices and methods for selectively tapping optical energy from an optical fibre.

SUMMARY OF THE INVENTION

According to one aspect of the present invention there is provided a device for selectively tapping optical energy from an optical fibre including means for causing spatially periodic deformation of the fibre and coupling of optical energy between modes of the optical fibre at a predetermined optical frequency or narrow band of optical frequencies, and means for removing from the fibre the optical energy at the predetermined optical frequency or narrow band of optical frequencies.

According to another aspect of the present invention there is provided a method of selectively tapping optical energy from an optical fibre including the steps of causing spatially periodic deformation of a section of the fibre and coupling of optical energy between modes of the optical fibre at a predetermined optical frequency or narrow band of optical frequencies, and removing from the fibre the optical energy to the predetermined optical frequency or narrow band of optical frequencies.

BRIEF DESCRIPTION OF THE DRAWINGS

Embodiments of the invention will now be described with reference to the accompanying drawings, in which.

In the copending U.S. applications Ser. No. 519,463 (R. E. Epworth et al) filed Aug. 1, 1982, (now abandoned) and British Application Ser. No. 8405853 (R. E. Epworth et al) filed Mar. 6, 1984, there are described the uses of sections of optical fibres as sensing elements. Application Ser. No. 519463 (now abandoned) corresponds to GB Application Ser. No. 8222371 which was published under GB Ser. No. 2125572 A and is the subject of GB Patent Ser. No. 2125572 B. British Application Ser. No. 8405853 was published under GB Ser. No. 2155621A. A disturbance to be sensed, for example pressure fluctuations due to an acoustic wave, is employed to cause coupling between separate modes of a fibre section through an appropriate transducer structure.

As described in the above-mentioned copending applications for sensor purposes the optical fibre is disposed relative to a support, for example, a grating or a cylindrical member whose diameter varies in a periodic manner, and the perturbation to be sensed causes the fibre to be pressed against the support and deformed, the amount of deformation achieved being related to the strength of the perturbation.

DETAILED DESCRIPTION OF THE INVENTION

Figure 1:
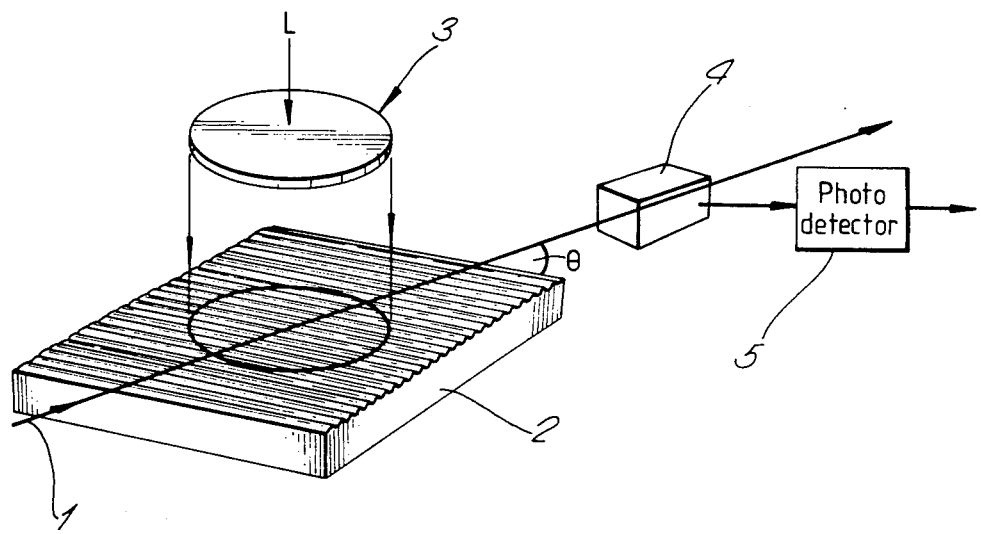
FIG. 1 shows, schematically, an embodiment of a tunable device for tapping optical energy from an optical fibre.
Figure 2:
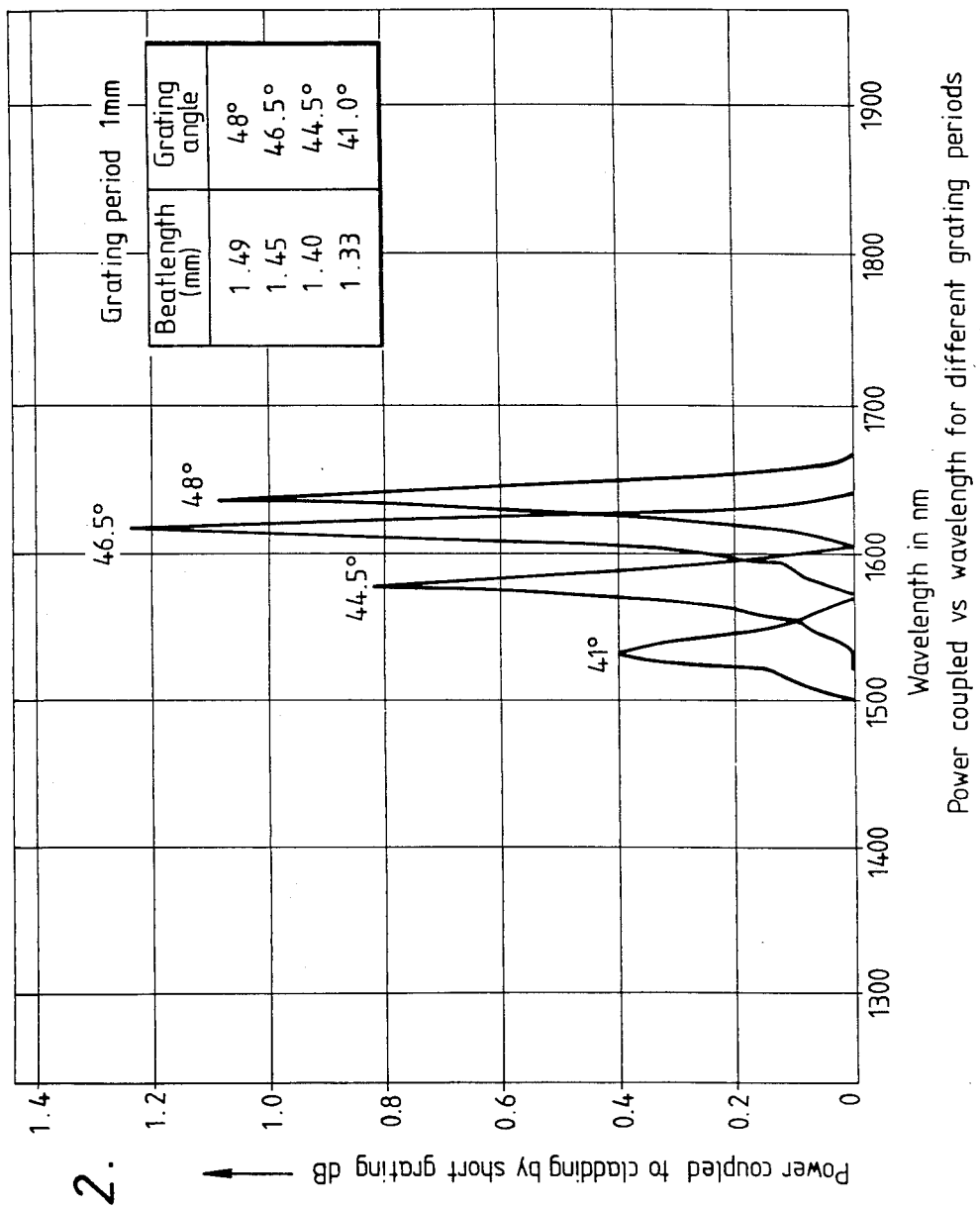
FIG. 2 shows a graph of power coupled versus wavelength for different grating periods.

The present invention proposes to employ controlled deformation of an optical fibre in order to selectively (by optical frequency) tap optical energy from an optical fibre. For example, a narrow frequency band of optical energy may be selectively tapped from a single mode fibre. As illustrated in FIG. 1 this is achieved by deforming a single mode fibre 1 by pressing it against a solid grating 2. The pressing means is indicated as a pressure plate 3 to which a load L is applied. The periodic deformation of the optical fibre 1 thus achieved will cause strong coupling between the guided mode (core mode) and the unguided cladding modes only when the spatial period or pitch of the deformation matches the beat length between the guided mode and the cladding modes. Coupling occurs between the guided mode and the cladding modes only at the optical frequency at which the inter-mode length matches the pitch of the fibre deformation. This frequency may be tuned by using different gratings of different pitches or by rotating the orientation of the grating with respect to the fibre, that is changing the angle $\theta$. FIG. 2 illustrates the amount of power coupled to the cladding by a short grating versus wavelength for different grating periods. The cladding light may be extracted by a suitable cladding mode tap 4 and detected by a photodetector 5. Examples of cladding mode taps are described in our British Patent Specifications No. 1590082 (R. E. Epworth 17) and in No. 1596869 (J.G. Farrington-T. Bricheno 8-1). Alternatively if a band stop filter is required then the tap 4 would be replaced by a region of cladding mode stripping material.

In the case of multimode optical fibre, controlled deformation of the fibre may be employed to achieve narrow band coupling between guided modes. Use of a "polarisation maintaining single mode fibre allows selective coupling between polarisation states thereof, orthogonally polarised states of the same order mode being considered as a single mode, and subsequent splitting [of a required band] may be achieved" by means of a polarization selective tap.

By varying the pressure between the fibre and the grating the extent of coupling (filter coupling) may be varied or switched off. Similarly, the filter shape may be tailored by varying the pressure across the grating.

Figure 3:
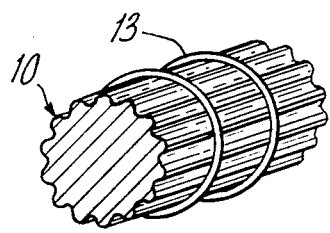
FIG. 3 shows an optical fibre wound on a splined mandrel.

The invention thus provides a tunable optical fibre wavelength demultiplexer. It is suitable for channel dropping in single mode systems. Multiple channel drops require several such devices. An arrangement comprising a sequence of such selective tapping devices can be envisaged, forming the multichannel wavelength multiplexer/demultiplexer, each device being associated with a respective optical frequency or narrow band of optical frequencies. The fibre itself is not permanently affected and does not need to be cut to install the device therein. The device may be comprised as a clip-on device in order to act as a temporary monitor during optical fibre installation. Very narrow bandwidth signals may be extracted by subjecting the fibre to periodic deformation over a very long length simply by winding it on a splined mandrel. Examples of such splined mandrel arrangements are described in the aforementioned copending application Ser. No. 519,463, the teachings of which are incorporated herein by reference. An example is illustrated in FIG. 3. A fibre 13 is applied helically to a splined mandrel 10.

We claim:

1. A device for selectively tapping optical energy from a single mode optical fibre having a core and cladding thereon, the optical energy to be tapped being supported in a mode of propagation guided in the core of the optical fiber, the device including means for causing spatially periodic mechanical deformation of the fiber and coupling of optical energy between the guided mode in the core and at least one unguided mode in the cladding of the optical fiber at a predetermined optical frequency, said optical frequency being predetermined by the periodicity of the mechanical deformation of the fiber, the coupling between the said guided and unguided modes of the single mode optical fiber being wavelength dependent and only taking place at that optical frequency at which the said periodicity corresponds to the beat length between said guided and unguided modes to be coupled, and means for removing from the cladding the optical energy at the predetermined optical frequency.

2. The device of claim 1 functioning as a band stop filter, the optical energy removing means comprising a region of cladding mode stripping material through which the fibre is passed.

3. A device as claimed in claim 1 functioning as a wavelength demultiplexer, the optical energy removing means comprising a cladding mode tap.

4. A device as claimed in claim 1 wherein said means for causing spatially periodic deformation of the fibre comprises a mechanical grating and means for pressing the fibre thereagainst.

5. A device as claimed in claim 4, wherein the pressure by which the fibre is urged against the grating is variable in a controlled manner.

6. A device as claimed in claim 4 wherein the predetermined optical frequency is determined by the relative orientation of the grating and the fibre, the device being tunable by adjusting said relative orientation.

7. A device as claimed in claim 1 and functioning as a clip-on device for the use in monitoring an optical fibre during installation thereof.

8. A device as claimed in claim 1 wherein said means for causing spatially periodic deformation of the fibre comprises a splined mandrel around which the fibre is wound.

9. A method for selectively tapping optical energy from a single mode optical fiber having a core and cladding thereon, the optical energy to be tapped being supported in a mode of propagation guided in the core of the optical fiber, including the steps of causing spatially periodic mechanical deformation of a section of the fiber and coupling of optical energy between the guided mode in the core and at least one unguided mode in the cladding of the optical fiber at a predetermined optical frequency, said optical frequency being predetermined by the periodicity of the mechanical deformation of the fiber, the coupling between the said guided and unguided modes of the single mode fiber being wavelength dependent and only taking place at that optical frequency at which said perodicity corresponds to the beat length between the said guided and unguided modes to be coupled, and removing from the cladding the optical energy at the predetermined optical frequency.

10. A device for selectively tapping optical energy from a single mode optical fiber having a core and cladding thereon, including means for causing spatially periodic mechanical deformation of the fiber and coupling of optical energy between a guided mode in the core and a mode or modes in the cladding of the optical fiber at a predetermined optical frequency, said means comprising a mechanical grating and means for pressing the fiber thereagainst, said predetermined optical frequency being predetermined by the periodicity of the mechanical deformation of the fiber and determined by the relative orientation of the grating and the fiber, the device being tunable by adjusting said relative orientation, the coupling between said modes of the single mode fiber being wavelength dependent and only taking place at that optical frequency at which the said periodicity corresponds to the beat length between said modes, and means for removing from the cladding the optical energy at the predetermined optical frequency.

11. A device for selectively tapping optical energy from a single mode optical fiber having a core and cladding thereon, including means for causing spatially periodic mechanical deformation of the fiber and coupling of optical energy between a guided mode in the core and a mode or modes in the cladding of the optical fiber at a predetermined optical frequency, said means comprising a splined mandrel around which the fiber is wound, said optical frequency being predetermined by the periodicity of the mechanical deformation of the fiber, the coupling between the said modes of the single mode optical fiber being wavelength dependent and only taking place at that optical frequency at which said periodicity corresponds to the beat length between said modes to be coupled, and means for removing from the cladding the optical energy at the predetermined optical frequency.

* * * * *